United States Patent [19]

Hüber

[11] 4,317,106

[45] Feb. 23, 1982

[54] DIGITAL INDICATING INSTALLATION FOR MOTOR VEHICLES

[75] Inventor: Manfred Hüber, Munich, Fed. Rep. of Germany

[73] Assignee: Bayerische Motoren Werke AG, Munich, Fed. Rep. of Germany

[21] Appl. No.: 932,785

[22] Filed: Aug. 11, 1978

[30] Foreign Application Priority Data

Aug. 12, 1977 [DE] Fed. Rep. of Germany ....... 2736465

[51] Int. Cl.[3] ....................... G08B 19/00; G06F 15/20

[52] U.S. Cl. ................................ 340/52 F; 237/2 A; 340/53; 340/62; 340/64; 364/424; 364/561; 368/6; 368/11

[58] Field of Search ..................... 340/52 R, 52 F, 53, 340/62, 501; 364/424, 426, 442, 551, 561, 569; 73/117.3, 116; 58/152 R, 152 B, 152 E; 180/77 R; 235/92 CT, 92 EA, 92 PE; 237/2 A; 368/6, 10, 11

[56] References Cited

U.S. PATENT DOCUMENTS

| | | | |
|---|---|---|---|
| 3,436,530 | 4/1969 | Faude et al. | 235/92 CT |
| 3,665,399 | 5/1972 | Zehr et al. | 340/501 X |
| 3,704,445 | 11/1972 | Lanham | 340/62 |
| 3,755,776 | 8/1973 | Kotras | 340/53 |
| 3,866,166 | 2/1975 | Kerscher et al. | 340/52 F |
| 3,921,875 | 11/1975 | Hengstler et al. | 235/92 CT |
| 3,964,302 | 6/1976 | Gordon et al. | 340/52 F X |
| 4,031,363 | 6/1977 | Freeman et al. | 340/52 F X |
| 4,053,749 | 10/1977 | Shinoda et al. | 364/424 |
| 4,071,892 | 1/1978 | Genzling | 364/424 |
| 4,072,850 | 2/1978 | McGlynn | 364/424 |
| 4,103,332 | 7/1978 | Floyd et al. | 364/424 X |
| 4,140,996 | 2/1979 | Leitch et al. | 340/52 F |

OTHER PUBLICATIONS

"Cadillac's Cockpit Copilot", vol. 29, No. 10, *Motor Trend*, Oct. 1977, pp. 106–107.

*Primary Examiner*—John W. Caldwell, Sr.
*Assistant Examiner*—Joseph E. Nowicki
*Attorney, Agent, or Firm*—Craig and Antonelli

[57] ABSTRACT

A digital indicating installation for vehicles which selectively reproduces several function values within an indicating field; by actuating one of several switches, the reproduction of a first function value is interrupted for a predetermined time and a further function value coordinated to the switch is reproduced in the meantime within the indicating field.

37 Claims, 2 Drawing Figures

DIGITAL INDICATING INSTALLATION FOR MOTOR VEHICLES

Figure 1:
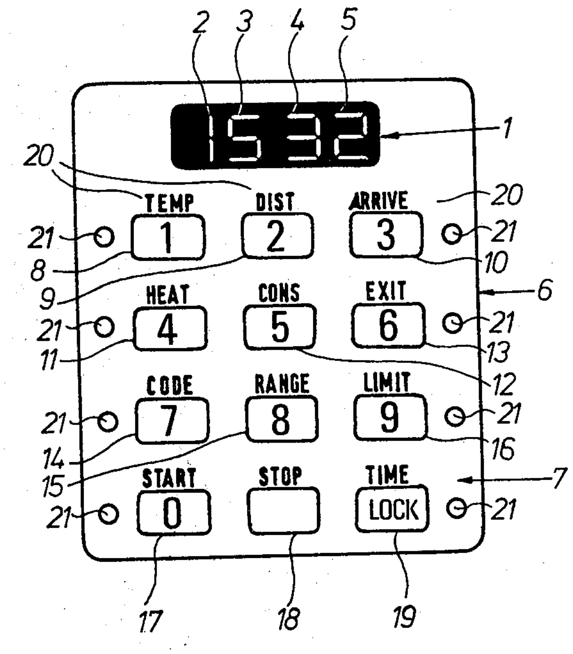

The present invention relates to a digital indicating installation for vehicles, which selectively reproduces several function values in an indicating field.

With a known indicating installation of this type (Automobiltechnische Zeitschrift No. 77 (1975) $\frac{7}{8}$, Page 219), the indicating installation serves as velocity indication selectively in km/h or miles/h. Furthermore, the engine rotational speed is separately reproduced in analog form as further function value.

The present invention is concerned with the task to provide an indicating installation of the aforementioned type, in which with slight structural expenditure, several function values and giving preference to a first function value are reproduced in a clear and readily recognizable manner.

The present invention solves the underlying problems by at least one switch, upon actuation of which the reproduction of a first function value is interrupted for a predetermined period of time and in the meantime a further function value coordinated to the switch is reproduced.

The temporary interruption impairs only insignificantly the reproduction of the first function value. The further function value which is of interest to the driver or is important for him is indicated for the driver in the same indicating field. Following the interruption, the first function value is again automatically indicated in the indicating field.

The first function value may be fixed, i.e., the same. In the alternative thereto, the first function value may also be selectable, for example, by means of a switch. This selection can also be cancellable or erasable by renewed actuation of this switch which may be a switch adapted to be locked by suitable detent means, or by actuation of another switch such as an erase or cancel switch.

In one embodiment of the present invention, the first function value is the time and the further function value may be operating-, distance-, measurement- and/or switching-data. These data may be for example: time of arrival which is obtained, for example, by means of a computer from the destination distance and the instantaneous velocity by utilizing the actual time, the outside temperature, the frequency of a tuned-in radio transmitter, the instantaneous fuel consumption, the average fuel consumption determined therefrom, and in connection with the fuel supply the probable range of the vehicle, a velocity warning when exceeding a predetermined maximum velocity or a reminder of an autobahn exit whose adjusted distance from the starting place is compared with the travelled distance.

The further function value may be recalled as a further development of the present invention directly out of a store or memory device. Further possibilities of use of the indicating field result therefrom for the indication of additional function value such as, for example, the travelled distance or the time elapsed since a predetermined point of time—stop watch.

If the store or memory device is a fixed value storage device and is coordinated to the switch of a switching device, during the actuation of which the further function value is cancelled or erased in the storage device and a new function value becomes adapted to be stored, an actual value, for example, the permitted maximum velocity may be fed into the storage device in lieu of a predetermined value.

The storage device may also automatically change its content as a function of time and/or as a function of travelled distance. In case the function value replaces the existing content, then in case of recall the driver receives the actual function value in the indicating field. If the function value is added to the already existing function values, then indications derived therefrom, for example, the average function value are realized. Examples therefor are the fuel consumption or the velocity of the vehicle.

A reproduction of the further function value in the indicating field, which is independent of the selection of the vehicle user, can be achieved in that the coordinated switch is actuated automatically. The actuation can take place when exceeding a predetermined limit value, for example, for the velocity or the total or instantaneous fuel consumption, or can take place in regular intervals dependent on time and/or travel distance. It is possible thereby with a suitable selection of the time interval and of the duration of the reproduction of the function value, to continuously reproduce in addition to the first function value, for example, of the time, a further function value, for example, the velocity or the engine rotational speed. In the case of the velocity as further function value, the reproduction duration of both function values are appropriately selected to be equal.

The application range of the indicating installation can be considerably enlarged according to the present invention in that for the triggering or initiation of a switching command after actuation of a switch, several switches are actuatable sequentially, whereby a numerical value is established in the indicating field by means of the switches for the control or checking of the switching command.

The switching command may be in an advantageous manner the unlocking of a theft-protection device prior to the start of a trip. After the operation of the switch for the theft protection device, a code number is set-up in the indicating field by means of the further switches, which code number is compared with a stored code number and which in case of agreement with the same enables the use of the motor vehicle.

The switching command may also be the switching time of a stationary heating system, i.e., of a heating device used while the vehicle is parked, e.g., in a garage. The adjusted values and/or with their input, new values to be adjusted of the turn-on time, of the turn-on duration and/or of the turn-off time of the stationary heating system may be checked in the indicating field.

Advantageous further developments of the present invention reside for that purpose in that the departure time is adjustable as numerical value and the switching time with respect to the same is advanced and in that the switching time is adapted to be triggered automatically in dependence on the ambient temperature. Additionally, the switching time may be increasingly advanced with respect to the time of departure with a decreasing ambient temperature. It is assured thereby that the vehicle interior is sufficiently warmed-up at the adjusted time of departure.

The switching command may also be the triggering of a warning indication, at a predetermined distance prior to reaching a destination or upon exceeding an adjusted limit velocity. The destination distance respectively the limit velocity are set up in the indicating field as numerical value.

As a further development of the present invention, an indicating light is coordinated to at least one switch, which lights up together with the indication of the function value coordinated to the switch. It can be immediately recognized thereby to which function the indicated function value is coordinated.

The indicating light may be automatically controlled in dependence on the function value coordinated to the switch. This may be of advantage, for example, when exceeding a limit value, since the indicating light alerts the vehicle driver independently of the actuation of the switch.

Accordingly, it is an object of the present invention to provide a digital indicating installation for vehicles, which avoids by simple means the aforementioned shortcomings and drawbacks encountered in the prior art.

Another object of the present invention resides in a digital indicating installation for vehicles which makes it possible to indicate in an easily and clearly recognizable manner several function values without the requirement of large structural expenditures.

A further object of the present invention resides in a digital indicating system for vehicles which is capable of reproducing several function values while preferring a first function value.

A still further object of the present invention resides in a digital indicating installation for vehicles which only insignificantly impairs the reproduction of a preferred function value by its interruption to reproduce other function values.

Another object of the present invention resides in a digital indicating installation for vehicles which greatly increases its versatility by enlarging the use and application possibilities of the indication thereof for indicating several additional function values.

A still further object of the present invention resides in a digital indicating system for vehicles which permits an indication of a number of function values of interest or of importance to the driver by the use of conventional computers, such as micro-processors, and by the use of extremely simple circuits that can be readily actuated by the driver without diverting his attention from the task of driving the vehicle.

Figure 2:
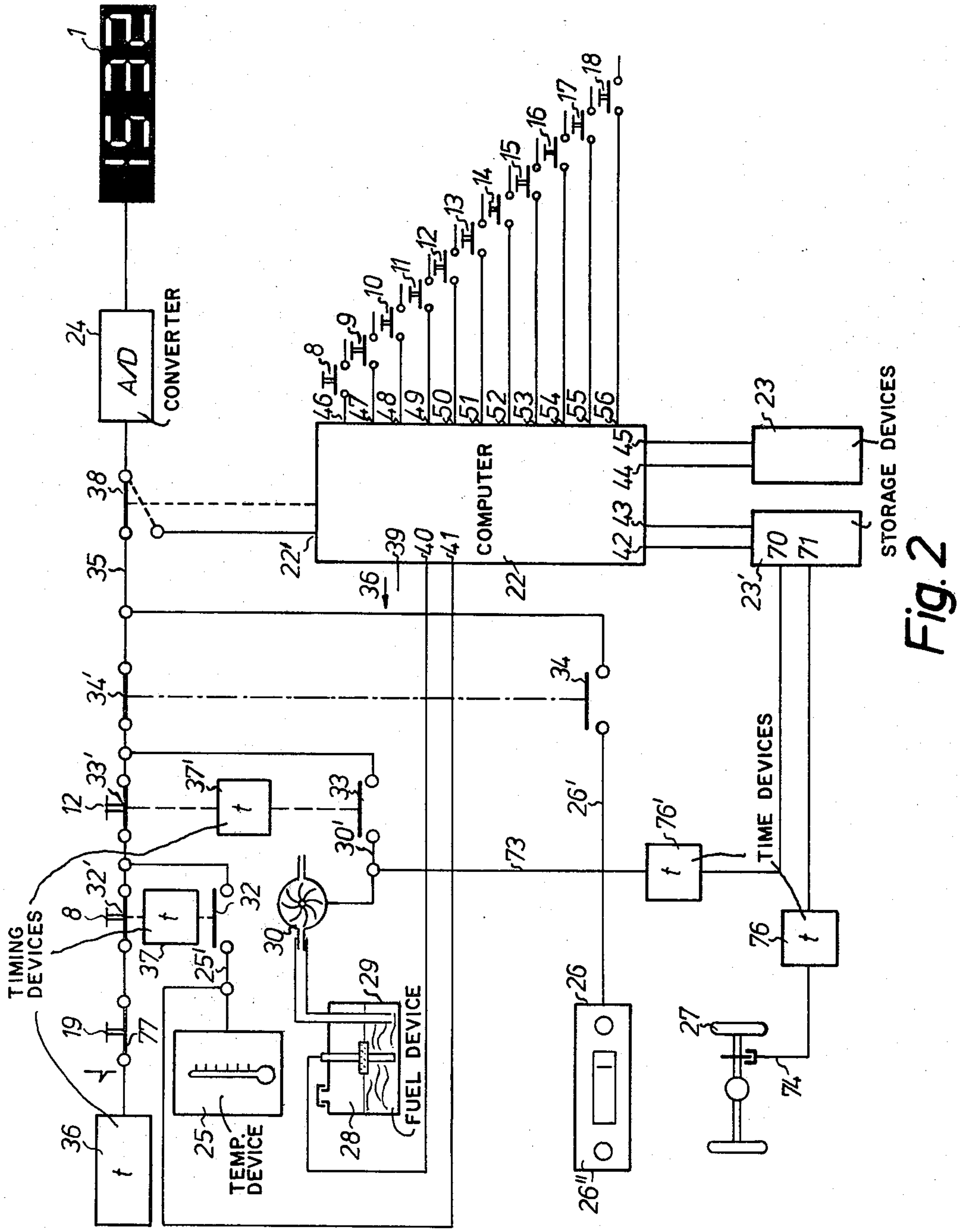

These and further objects, features and advantages of the present invention will become more apparent from the following description when taken in connection with the accompanying drawing which shows, for purposes of illustration only, one embodiment in accordance with the present invention, and wherein:

FIG. 1 is an elevational view of an indicating field and of an operating field coordinated thereto for an indicating installation in accordance with the present invention in motor vehicles; and FIG. 2 is a schematic circuit diagram, partly in block form, of an arrangement of switching-, control-, storage-, and computer elements cooperating with the indicating installation in accordance with the present invention.

Referring now to the drawing wherein like reference numerals are used in the two views thereof to designate corresponding parts, in FIG. 1 an indicating field generally designated by reference numeral 1 is illustrated as electronic-optical building block, in which four numbers 2 to 5 are reproduced adjacent one another. An operating field generally designated by reference numeral 7 is combined with the indicating field 1 into a structural unit 6, in which twelve pushbutton switches 8 to 19 are arranged. Of these pushbuttons, the pushbutton switches 8 to 17 carry the numbers from 1 to 9 and 0. The pushbutton switch 18 is without labelling whereas the pushbutton switch 19 carries the labelling "lock". A labelling 20 for a double function of the switches 8 to 19 is provided above the same and one light diode 21 each is arranged adjacent the lateral pushbutton switches 8, 10, 11, 13, 14, 16, 17 and 19.

The pushbutton switches 8 to 17 which are provided with a double function serve in connection with further conventional switching-, controlling-, storage- and computer-elements, on the one hand, for the input of numerical values which are coordinated respectively to a switching command, and, on the other, control together with the pushbutton switch 18 the reproduction of further function values. During the driving operation, the time is continuously reproduced as first function value. If, however, one of the pushbutton switches 8 to 18 is actuated, then the reproduction of the time is interrupted in the indicating field 1 during a predetermined period of time and the function value coordinated to the respective pushbutton switch is indicated in lieu thereof.

For that purpose, a computer 22, a fixed value storage device 23 and a variable storage device 23', an analog-digital converter 24 as well as a number of electrical transmitters or pick-ups, all of known construction as such, are coordinated to the indicating field 1, as illustrated in FIG. 2. The output of the analog-digital converter 24 is fed to the indicating field 1.

The measurement transmitters or pick-ups are a transmitter 25 for the ambient temperature, a transmitter 26 for the frequency of a radio transmitter tuned-in on a radio 26'', a transmitter 27 for the wheel rotational speed and therewith for the velocity of the motor vehicle, a filling-level transmitter 28 for a fuel storage tank 29, as well as a through-flow transmitter 30 for the fuel quantity removed from the fuel tank 29. A suitable signal of a fuel injection installation or a signal derived from the difference of, for example, the average fuel reservoir values as determined by means of the filling level transmitter 28, may also be used in lieu thereof.

Electric lines 25', 30' and 26' lead from the transmitters 25, 30 and 26 to the analog-digital converter 24, whereby a normally opened switching contact 32, 33 and 34, opened in the normal rest position, is arranged in the respective line 25', 30' and 26'. A normally closed further switching contact 32', 33' respectively 34' is coupled with the switching contacts 32, 33 respectively 34. The switching contacts 32' to 34' are series-connected in an electric line 35 which also leads from a time transmitter 36 to the analog-digital converter 24. The switching contacts 32 and 32' respectively 33 and 33' are each actuated in unison by the pushbutton switches 8 respectively 12. A coordinated time-control switching device 37 respectively 37' of conventional construction maintains after actuation of the pushbutton switches 8 respectively 12, the engaged switching condition of the switching contacts for a predetermined time of, for example, five seconds. The switching contacts 34 and 34' are also actuated in unison for a short time interval of, for example, two seconds upon actuation of the transmitter-tuning means in the radio and upon turning-on of the radio.

A two-position switch 38 is coordinated to the analog-digital converter 24 which in its normal position connects the line 35 with the analog-digital converter 24 and which in its operating position—controlled by the computer 22—connects the output 22′ thereof with the analog-digital converter 24.

The computer 22 includes a number of inputs 39 to 56, of which the inputs 39, 40 and 41 lead respectively to one of the transmitters 36, 28 and 25, the inputs 42 and 43 to the variable storage device 23′ and the inputs 44 and 45 to the fixed value storage device 23, and of which the inputs 46–56 are controllable by way of the pushbutton switches 8–18.

The variable storage device 23′ includes inputs 70 and 71 which are connected by way of lines 73 and 74 with the transmitters 30 and 27. Time-control switching devices 76 respectively 76′ are connected respectively in the lines 73 and 74, which close the lines 73 respectively 74 in regular time intervals of, for example, five seconds for a short period of time.

One switching respectively operating command may be fed to the computer 22 by way of the inputs 47 to 49 and 51 to 56. The switching respectively operating command consists for the inputs 47, 49, 51, 52 and 54 in conjunction with a subsequent input of a number having at most of four digits, by actuation of a corresponding number of pushbutton switches 8 to 17 provided with numbers, in feeding this numerical value into the fixed value storage device 23 as distance indication in km (upon control of the input 47), as departure time for deriving the switching time of a stationary heating means in hours and minutes (input 49), as destination distance, for example, of an autobahn exit, in km (input 51), as code number for a theft protection device (input 52) or as permissive maximum velocity km/h (input 54) or to compare the same with a numerical value contained therein and to possibly carry out further measures, for example, the unlocking of a theft protection device in case of agreement of the fed-in code number with a stored code number. The numerical value, for example, 2607 by actuation of the pushbutton switches 9, 13, 17 and 14 is reproduced for checking and control purposes in the indicating field upon the input thereof in lieu of the time.

With a control of the inputs 48 or 53 by way of the pushbutton switches 10 or 15, the computer calculates the probable time of arrival, utilizing as base the time, the stored destination distance, the distance travelled since the start of the drive, as well as the average of the velocity travelled in a last road section, or the probable range of the vehicle from the average of the instantaneous fuel consumption values reaching the variable storage device 23′ in regular time intervals, and from the fuel reserve determined by means of the filling-level transmitter 28. The probable time of arrival respectively the probable range are illustrated in the indicating field 1 during a predetermined period of time of, for example, five seconds in lieu of the time.

A stop watch for the determination of a time interval is controlled by way of the inputs 55 and 56 (pushbutton switches 17 and 18). After actuation of the pushbutton switch 17, the time interval to be measured starts to run from 0 and appears in the indicating field 1 upon renewed actuation of the pushbutton switch 17 as intermediate value for a short period of time in lieu of the time provided by the time transmitter 36. By actuation of the pushbutton switch 18, this stop watch is stopped and the stopped or clocked time interval is continued to be indicated for a few more seconds in the indicating field 1. Subsequently thereto, the time of the time transmitter 36 reappears automatically.

The automatic switching back to the reproduction of the instantaneous time after carrying out an inquiry or question, input or time measuring operation—with a retained indication of the further function value coordinated to the respectively actuated pushbutton switch 8 to 18—can be prevented with the aid of a switching contact 77, controlled by the pushbutton switch 19, in the line 35 between the time transmitter 36 and the switching contact 32′ for such length of time until the pushbutton switch 19 is again actuated.

When turning on respectively tuning the radio 26″, the frequency of the tuned-in radio transmitter appears in the indicating field 1 for a short period of time and by way of the then actuated switching contacts 34 and 34′ in lieu of the time.

If the pushbutton switch 8 is actuated, then the connection of the time transmitter 36 with the analog-digital converter 24 is interrupted by the switching contact 30′ during the period of time determined by the time-control switching device 37 and the temperature transmitter 25 is connected with the analog-digital converter 24 by way of the switching contact 32. Thus, the outside temperature appears temporarily in the indicating field 1 as digital value and subsequent thereto the time reappears again automatically.

The connection of the time transmitter 36 with the analog digital converter 24 is also interrupted by means of the pushbutton switch 12 with the aid of the switching contacts 33 and 33′ and in lieu thereof the through-flow transmitter 30 is switched to the analog-digital converter 24 in lieu thereof for a period of time determined by the time-control switching device 37′. The indicating field 1 thus indicates the fuel consumption.

After the actuation of the pushbutton switch 10 respectively 15, the computer 22 actuates the double-throw switch 38 during a predetermined period of time of, for example, five seconds and feeds the calculated value of the probable time of arrival respectively of the probable range of the motor vehicle to the analog-digital converter 24 which reproduces the same in the indicating field 1.

Upon actuation of the pushbutton switch 9, the computer actuates the double-throw switch 38 for a predetermined period of time of, for example, five seconds and feeds to the analog-digital converter 24 the destination distance stored in the fixed value storage device 23. This destination distance appears in the indicating field 1. If within this period of time a numerical value is fed into the computer 22 by sequential actuation of up to four of the pushbutton switches 8 to 17 provided with the numbers 0 to 9, then this numerical value appears for check and control purposes in the indicating field 1 and is stored by the computer 22 in the fixed value storage device 23 in lieu of the prior value of the destination distance.

In a corresponding manner, by actuation of the pushbutton switches 11, 13, 14 and 16, the values of the departure time, of the destination distance, for example, of an autobahn exit, the code number as well as the adjusted permissive maximum velocity can be reproduced in the indicating field 1 by way of the switch 38 and the analog-digital converter 24 and can possibly be replaced as new value by the subsequent input of a numerical value with the aid of the pushbutton switches 8 to 17.

The computer 22 controls the engagement of the stationary heating device below a value of the ambient temperature of, for example, 10° C. as determined by means of the transmitter 25 and a fixed predetermined time interval prior to the adjusted time of the departure. In the alternative, this time interval may also be increased with a dropping ambient temperature. The stationary heating system may additionally also be automatically turned off a predetermined period of time after the departure time. By actuation of the pushbutton switch 11 without subsequent input of a departure time, the switching programming is cancelled or erased.

After the input of the destination distance, a reminder signal is produced at a predetermined distance of, for example, 1 km ahead of the destination. This may be, for example, the alternate reproduction for short periods of time of the adjusted destination distance and of the time or an acoustic signal, for example, a gong sound.

It is prevented by suitable circuit means of known type that the stored code number appears in the indicating field prior to the start of a drive during actuation of the pushbutton switch 14. Instead, the indicating field 1 remains dark in this case and merely reproduces the code number to be set by means of the pushbutton switches 8 to 17 after actuation of the pushbutton switch 14.

Additional circuit means of known type assure that upon exceeding the permissive maximum velocity which has been stored after the actuation of the pushbutton switch 16, the computer 22 feeds the value to the indicating field 1 by way of the analog-digital converter 24 in lieu of the time, for example, as flashing signal and possibly triggers additionally, for example, acoustic warning signals or indications.

For purposes of recognition of the function or numerical value reproduced in the indicating field 1, the light diode 21 coordinated to the respective pushbutton switch 8, 10, 11, 13, 14, 16, 17 or 19 lights up during actuation thereof. The light diodes 21 may also assume additional warning or reminder functions by suitable circuit means of known type. Thus, it is possible, for example, that the light diode 21 adjacent the pushbutton switch 8 emits a blinking signal as soon as the outside temperature as measured by the temperature transmitter 25 lies within a predetermined range of, for example, ±3° C. and it is particularly important for reasons of icing danger to specially observe the outside temperature and to examine the same eventually by actuation of the pushbutton switch 8.

It is possible by additional pushbutton switches (not shown) possibly in conjunction with a larger digit number of the indicating field 1 to carry out also arithmetic calculation operations with the aid of the computer 22 and for that purpose to apply as inputs numbers by means of the pushbutton switches 8 to 17 and reproduce the same in the indicating field 1 in lieu of the instantaneous time.

Furthermore, for example, also the operating hours of the driving engine since the last service and the entire fuel consumption during a travelled distance can be determined by means of the computer 22 either automatically or possibly in conjunction with additional pushbutton switches and may be reproduced temporarily in the indicating field 1 in lieu of the first function value (time).

It is possible with the aid of additional transmitters, possibly with the aid of transmitters already present in the motor vehicle, for example, with the air pressure transmitter for a fuel injection system, to indicate in the indicating field for short periods of time indications derived therefrom, for example, the local altitude with an interrupted reproduction of the time.

For the reinforcement of a warning indication in the indicating field 1, for example, when exceeding the permissive maximum velocity, the coordinated light diode 21 or an already present, central acoustic or optical warning indication for monitoring operating functions, such as oil pressure, cooling water temperature may produce an additional warning signal.

A large number of function- or numerical-values may be reproduced in an advantageous manner within the indicating field 1 by means of the indicating installation according to the present invention in addition to the instantaneous time. The driver has to concentrate solely on a single indicating field for different function values whereas otherwise he is forced with several individual indications or indicating fields to make a selection from a plurality of indications and to incorporate the same into his attention. The present invention makes it possible that no simultaneous observation of several indications is necessary and a vehicle driver is not excessively distracted from his attention to the traffic.

It is also possible within the scope of the present invention to select the velocity as first function value and to indicate only for very short periods of time or possibly repeatedly further function values during the drive only in case of danger and/or only in case of questioning. The respective further function value can additionally be characterized or distinguished continuously. For example, the light diodes coordinated to the switches as well as possibly acoustic indications are suited for this purpose. The indicating installation according to the present invention may be constructed both as additional instrument as also as main indicating instrument for motor vehicles.

Since those parts shown only schematically or in block diagram are of known construction and/or utilize conventional electronic circuits or logic circuit elements, forming no part of the present invention, a detailed description thereof is dispensed with herein for the sake of simplicity.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

I claim:

1. A digital indicating installation for vehicles having means for generating a first function value and at least one further function value and which selectively displays several function values in a single indicating field comprising display means responsive to the generating means for normally displaying the first function value in the indicating field, and at least one switch means operable during the actuation thereof to interrupt the display of the first function value for a fixed predetermined time, the display means being responsive to operation of the at least one switch means for displaying in the indicating field during the fixed predetermined time a single further function value coordinated to the at least one switch means and for automatically displaying in the indicating field the first function value after the expiration of the fixed predetermined time, and further comprising means responsive to the actuation of the at least one switch means for initiating a switching command and enabling a numerical value to be displayed in the indicating field in accordance with subsequent actuation of the at least one switch means.

2. An indicating installation according to claim 1, wherein the at least one switch means includes pushbutton switch means and switching contact means.

3. An indicating installation according to claim 1, wherein the first function value is time and the further function value includes at least one of operating-, distance-, measurement and switching-data.

4. An indicating installation according to claim 1, wherein a plurality of further function values is provided and include operating-, distance-, measurement and switching-data.

5. An indicating installation according to claim 1, wherein the display means includes storage means for storing a further function value and recall means coordinated to the at least one switch means for recalling the further function value from the storage means for display in the indicating field.

6. An indicating installation according to claim 5, wherein the storage means includes a fixed value storage means, and further comprising means coordinated with the at least one switch means for enabling erasing of the further function value in the fixed value storage means and the storage of a new function value in the fixed value storage means during the actuation of the at least one switch means.

7. An indicating installation according to claim 5 or 6, wherein the storage means includes a variable value storage means and further comprising means for automatically changing the contents of the variable value storage means.

8. An indicating installation according to claim 7, wherein the automatic content changing means automatically changes the content of the variable value storage means automatically as a function of time.

9. An indicating installation according to claim 7, wherein the automatic content changing means automatically changes the content of the variable value storage means as a function of travel distance.

10. An indicating installation according to claim 1 comprising automatic control means for actuating the at least one switch means to provide automatic interruption of the display of the first function value for a fixed period of time.

11. An indicating installation according to claim 10, wherein the automatic control means actuates the at least one switch means substantially upon reaching a predetermined limit value.

12. An indicating installation according to claim 11, wherein the automatic control means actuates the at least one switch means upon exceeding a predetermined limit value.

13. An indicating installation according to claim 10, wherein the automatic control means automatically actuates the at least one switch means in regular time intervals.

14. An indicating installation according to claim 10, wherein the switching command means initiates the unlocking of a theft protection means prior to the start of a drive and the numerical value is a code number.

15. An indicating installation according to claim 10, wherein the switching command means initiates the switching time of a stationary heating means and the numerical value is the value of the switching time.

16. An indicating installation according to claim 15, wherein the switching command means enables the setting up of a departure time as a numerical value and the switching time of the stationary heating means is advanced with respect to the departure time.

17. An indicating installation according to claim 16, further comprising means for sensing ambient temperature and for triggering the switching time automatically in dependence on the ambient temperature.

18. An indicating installation according to claim 17, wherein the switching command means enables increasing advancement of the switching time with respect to the departure time in accordance with a decreasing temperature.

19. An indicating installation according to claim 10, wherein the switching command means enables the initiation of a warning indication at a predetermined distance prior to reaching a destination set-up as a numerical value.

20. An indicating installation according to claim 10, wherein the switching command means enables the triggering of a warning indication upon exceeding a limit velocity set-up as a numerical value.

21. An indicating installation according to claim 10, further comprising indicating light means coordinated to the at least one switch means, the indicating light means being energized together with the indication of the function value coordinated to the at least one switch means.

22. An indicating installation according to claim 21, wherein the light means is a diode.

23. An indicating installation according to claim 21, wherein the indicating light means is automatically controlled in dependence on the function value coordinated to the at least one switch means.

24. An indicating installation according to claim 1, wherein the switching command means initiates the unlocking of a theft protection means prior to the start of a drive and the numerical value is a code number.

25. An indicating installation according to claim 1, wherein the switching command means initiates the switching time of a stationary heating means and the numerical value is the value of the switching time.

26. An indicating installation according to claim 25, wherein the switching command means enables the setting up of a departure time as a numerical value and the switching time of the stationary heating means is advanced with respect to the departure time.

27. An indicating installation according to claim 26, further comprising means for sensing ambient temperature and for triggering the switching time automatically in dependence on the ambient temperature.

28. An indicating installation according to claim 27, wherein the switching command means enables increasing advancement of the switching time with respect to the departure time in accordance with a decreasing temperature.

29. An indicating installation according to claim 1, wherein the switching command means enables the initiation of a warning indication at a predetermined distance prior to reaching a destination set-up as a numerical value.

30. An indicating installation according to claim 1, wherein the switching command means enables the triggering of a warning indication upon exceeding a limit velocity set-up as a numerical value.

31. An indicating installation according to claim 1, further comprising indicating light means coordinated to the at least one switch means, the indicating light means being energized with the indication of the function value coordinated to the at least one switch means.

32. An indicating installation according to claim 31, wherein the indicating light means is automatically controlled in dependence on the function value coordinated to the at least one switch means.

33. An indicating installation according to claim 32, wherein the at least one switch means includes a plurality of switch means and the indicating light means includes a plurality of indicating light means, a respective indicating light means being coordinated with a respective switch means.

34. An indicating installation according to claim 32, comprising automatic control means for actuating the at least one switch means to provide automatic interruption of the display of the first function value for a fixed time.

35. An indicating installation according to claim 34, wherein the automatic control means actuates the at least one switch means substantially upon reaching a predetermined limit value.

36. An indicating installation according to claim 34, wherein the automatic control means actuates the at least one switch means upon exceeding a predetermined limit value.

37. An indicating installation according to claim 34, wherein the automatic control means automatically actuates the at least one switch means in regular time intervals.

* * * * *